United States Patent Office 2,890,394
Patented June 9, 1959

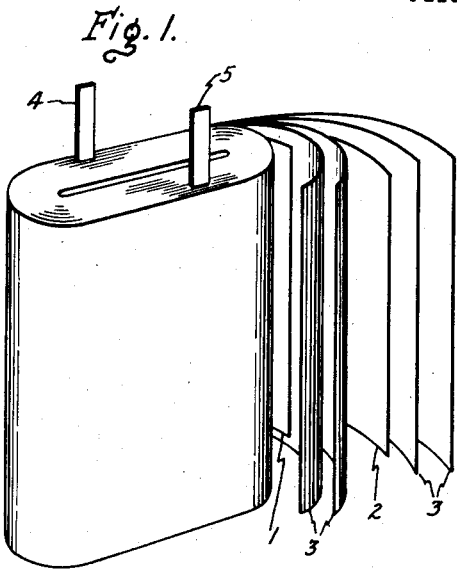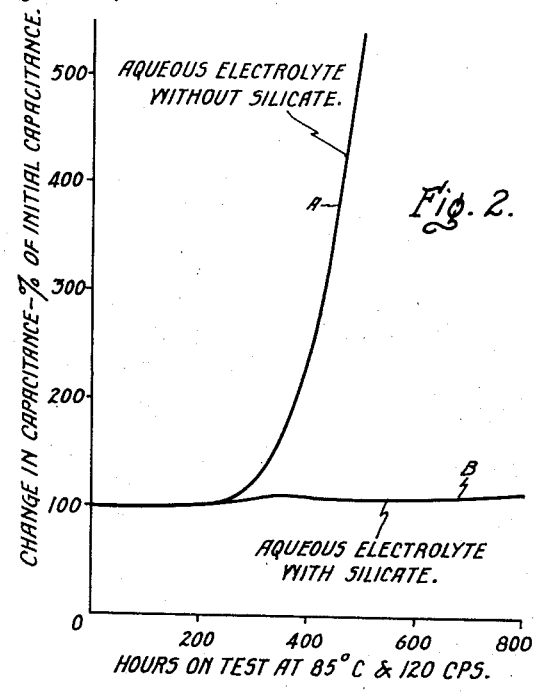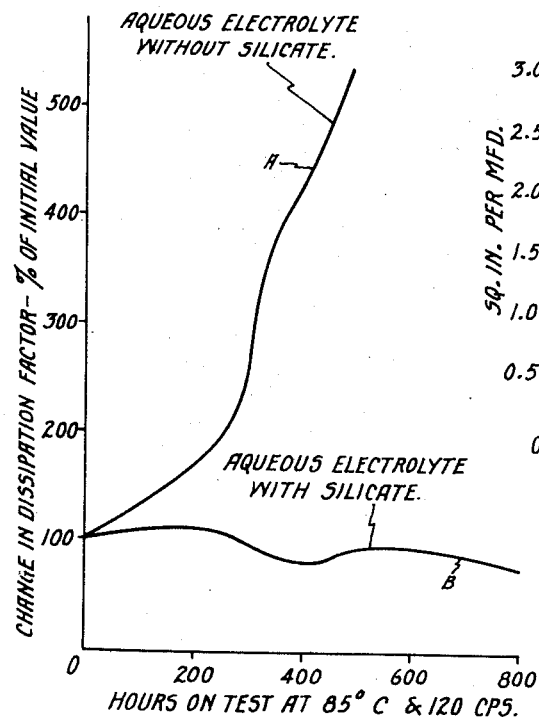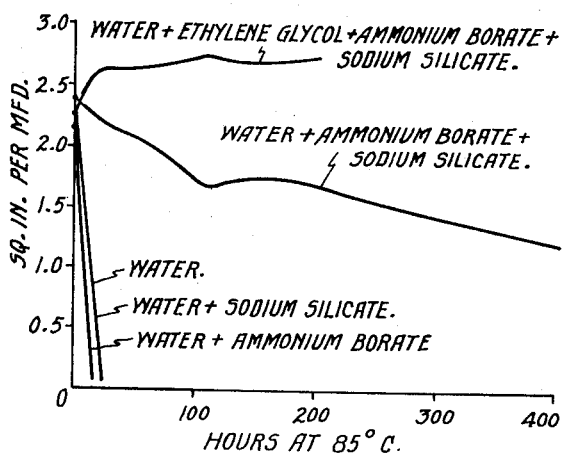
Fig. 1.
Fig. 2.
Fig. 3.
Fig. 4.
Inventors
Donald H. Stephenson,
Alfred L. Jenny,
by
Their Attorney.

2,890,394

ELECTROLYTE FOR ELECTROLYTIC CAPACITORS

Donald H. Stephenson and Alfred L. Jenny, Glen Falls, N.Y., assignors to General Electric Company, a corporation of New York Application April 13, 1955, Serial No. 501,136

7 Claims. (Cl. 317—230)

The present invention relates to electrolytic devices, and more particularly to an improved electrolyte for electrolytic capacitors.

Electrical failures which have been encountered in the past in electrolytic capacitors, particularly those having aluminum electrodes, have for some time been recognized as due in many cases to the deterioration of the aluminum oxide dielectric film on the aluminum electrodes during idle shelf periods by hydration effects. The hydrated oxide is a poor dielectric and does not have the rectifying properties of the anhydrous oxide film. To correct this condition and to decrease the hydration rate, various measures have been attempted in the past such as keeping the pH of the electrolyte below 7.0, maintaining the water content low, and limiting the operating temperature range. These measures, however, have not in general provided satisfactory, the low water contents, for example, decreasing the conductivity of the electrolyte, and past remedies generally have unduly limited the operating conditions of the capacitors.

It is, therefore, an object of the present invention to provide electrolytic capacitors, particularly those having aluminum components, which overcome the above disadvantages of the prior art capacitors.

It is another object of the invention to provide electrolytic capacitors of the above type which have a high degree of stability over a wide temperature range and improved shelf-life characteristics even when kept idle for prolonged periods at elevated temperatures.

It is still another object of the invention to provide electrolytic capacitors of the above type having capacitance and power loss characteristics which remain relatively constant over extended periods of time and over a wide range of operating conditions.

It is a particular object of the invention to provide an improved aqueous electrolyte for electrolytic capacitors for preventing hydration of the aluminum oxide film on the aluminum electrodes or other aluminum parts of the capacitor.

To achieve the above objects, the present invention provides an electrolytic device such as an electrolytic capacitor having aluminum electrodes and an aqueous electrolyte therein containing a water soluble ammonium salt and a dispersion of a silicate compound. In the aqueous electrolyte other components may be incorporated, as, for example, ethylene glycol, for the purpose of adapting the capacitor for low temperature operation. The ammonium salt may consist, for example, of ammonium borate or any other water soluble ammonium compound, while the silicate which is also water soluble may be, for example, sodium metasilicate.

A number of marked advantages have been obtained by the addition of the silicate compound to the aqueous electrolyte described above as compared to the prior art types of capacitor electrolytes. The present electrolyte avoids the necessity for keeping the pH of the solution below 7.0 and may have the pH extended to at least 8.0. For another thing, the water content may be considerably increased if desired, and the operating temperature range may be considerably widened. Further, aluminum electrolytic capacitors have been produced incorporating the present electrolyte which have good electrical properties even as low as —55° C., as compared to the previously obtainable lower limit of about —30° C. of comparable prior art electrolytes.

The invention will be better understood when taken in connection with the following description and the accompanying drawing, in which:

Fig. 1 illustrates a form of capacitor in which the present invention may be suitably employed;

Fig. 2 graphically illustrates the improved capacitance characteristics of the present electrolyte;

Fig. 3 graphically illustrates the improved power loss characteristics of capacitors embodying the present electrolyte; and Fig. 4 graphically illustrates the effects produced by various combinations of the components of the present electrolyte.

Referring now to the drawing, and particularly to Fig. 1, the capacitor shown comprises cooperating aluminum armatures or electrodes 1 and 2 in the form of thin foils. The electrodes are preferably, but not necessarily, etched and formed or filmed in accordance with known practice, the aluminum electrodes having thereon a thin film of aluminum oxide serving as the dielectric film. Between the armatures or electrodes 1 and 2 is a spacer 3 consisting of one or more sheets of paper or other suitable absorbent spacer material which is impregnated with the electrolyte composition. Terminal tabs or tap straps 4 and 5 of the elongated strip type are provided for electrical contact respectively with the electrode foils 1 and 2. After impregnation with the electrolyte composition, the assembly is placed in a suitable container (not shown) which is sealed and provided in the usual manner with external terminals electrically connected to tap straps 4 and 5. Alternatively, the assembly may be first placed in the container which is then filled through a suitable opening with the electrolyte composition. Other types of electrolytic capacitors may be used if desired without going beyond the scope of the invention, as for example a stacked type or a cathode casing type, the latter with or without a spacer between cathode and anode.

Experiments conducted on the deteriorating effects of hydration on anodic films on the surface of the aluminum foil at 85° C. showed that such deterioration was more rapid in electrolytes of higher water content. The following table shows the results of a typical test, percent D in the table referring to dissipation factor and the weight values showing the change in weight of the foil:

TABLE I

| Electrolyte | Percent Water | Weight Change in Milligrams | Change in Capacitance | Change in Percent D |
|---|---|---|---|---|
| A | 4.0 | −0.3 | +1.19/1 | +1.65/1 |
| B | 40.0 | −2.65 | +58.5/1 | +38/1 |

The large increase in capacitance indicates substantial film deterioration and the large positive change in percent D shows high current losses in the film. As apparent from the above results, an increased water content in the electrolytes causes a considerable variation in both capacitance and dissipation factor. The loss in weight occurs as a result of the hydrate film falling off or dissolving in the electrolyte.

It was found in accordance with the present invention that the hydration effects on the aluminum oxide dielectric film could be prevented or substantially inhibited by the inclusion in an aqueous electrolyte of an ammonium salt and a silicate. Tests were made on a number of electrolytes wherein one of the electrolytes was composed of ethylene glycol, water and ammonium borate, while the others were of the same composition except that they contained varying amounts of sodium metasilicate. In the tests, samples of oxidized aluminum foil were immersed in the test electrolytes at 85° C. It was found that all the silicate-treated electrolytes had considerably superior electrical properties as compared to the electrolyte not so treated, indicating substantial inhibition of the hydration effect described.

Fig. 2 shows a comparison of capacitance characteristics of a prior art type electrolyte not having a silicate compound incorporated therein and an electrolyte of the present invention having a silicate compound in accordance with the invention. Curve A represents the change in capacitance in terms of percent of the initial capacitance of an electrolyte having the following compositions in percent by weight:

Electrolyte A

| | Percent |
|---|---|
| Ethylene glycol | 57.9 |
| Distilled water | 38.6 |
| Ammonium borate | 3.5 |

Curve B represents the same characteristics of an electrolyte of the present invention having the following composition:

Electrolyte B

| | | |
|---|---|---|
| Ethylene glycol | percent | 57.9 |
| Distilled water | do | 38.6 |
| Ammonium borate | do | 3.5 |
| Sodium metasilicate | p.p.m. | 400 |

Curve B is characteristic of all the electrolyte compositions which contained varying amounts of sodium metasilicate. As is evident from the graph, the silicate-containing electrolyte was considerably more stable in terms of capacitance and dissipation factor (power loss) as compared to the untreated electrolyte.

Fig. 3 is a similar graphical showing of the identical electrolyte compositions mentioned above, this figure showing the relative change in the dissipation factor in percent of the initial value as plotted against the life test in hours at 85° C. and 120 cycles per second. Here again the much more uniform dissipation factor of the present silicate-containing electrolyte as compared to the untreated electrolyte is clearly apparent.

Exhaustive tests were carried out using such analyses as X-ray diffraction, emission spectroscopy, electron diffraction and chemical analyses to determine the effects of hydration on the aluminum foil and the results of using the present electrolyte. These tests conclusively showed that the oxide film on aluminum foil, which is formed in the usual manner, was substantially removed by the effects of hydration when the foil was immersed in an aqueous electrolyte solution under heat (85° C.) for a prolonged period. As indicated above, the hydrate film which is formed apparently falls off or dissolves in the electrolyte during the prolonged immersion. On the other hand, analysis of an aluminum foil similarly treated in the same electrolyte to which some sodium silicate had been added showed the presence of a non-hydrated aluminum oxide film on the foil surface. These analyses further showed that when treated in a silicate-ammonium electrolyte, the foil was covered with an amorphous film, which spectrographic tests revealed as containing a substantial amount of silicon, suggesting that the foil surface may be covered with an amorphous silicon oxide or silicate.

Further tests were conducted to determine the mechanism of inhibition and to discover the causative factor which prevented hydration effects, and in these tests various combinations of the components of the aqueous electrolyte were tested with the results shown in the graph of Fig. 4. In the graph the curves represent various combinations of the electrolyte components in terms of change in capacitance given in square inches per microfarad, as plotted against the hours on test at 85° C. As shown in the graph, water alone, water and sodium silicate, and a solution of water with ammonium borate all exhibited a considerable increase in capacitance at the end of the illustrated period of test which amounted to less than 25 hours. On the other hand, electrolytes containing a mixture of water, ammonium borate, and sodium silicate, and the same composition but with ethylene glycol added showed a remarkable improvement in terms of capacitance stability. The former electrolyte composition showed only a comparatively small gain in capacitance per unit area after as much as 400 hours at the elevated temperature, while the latter composition over the 200 hour period tested showed an initial slight decrease in capacitance per unit area and a relatively uniform curve thereafter. It is apparent from the results shown in the graph of Fig. 4 that it requires the presence of both the ammonium salt and the silicate compound in an aqueous electrolyte to effectively overcome the hydration effects and resulting deterioration in electrical properties of the dielectric film, neither ingredient by itself in the electrolyte being capable of producing the desired results of improved stability.

Contrary to what might have been expected, the addition of the silicate compounds to the aqueous electrolytes did not cause the solution to gel nor in fact bring about a substantial change in viscosity. This is demonstrated by the results of viscosity-time studies made with respect to different electrolytes, of the following compositions in percent by weight:

Electrolyte C

| | Percent |
|---|---|
| Ethylene glycol | 50.4 |
| Water | 35.4 |
| Ammonium succinate | 14.2 |

Electrolyte D

| | |
|---|---|
| Ethylene glycol | 60 |
| Water | 37.92 |
| Ammonium borate | 2.0 |

Six test samples using these electrolytes were prepared as follows:

Sample 1—Electrolyte C only
Sample 2—Electrolyte C+1000 p.p.m. sodium metasilicate
Sample 3—Electrolyte C+1000 p.p.m. tetraethylorthosilicate
Sample 4—Electrolyte D only
Sample 5—Electrolyte D+1000 p.p.m. sodium metasilicate
Sample 6—Electrolyte D+1000 p.p.m. tetraethylorthosilicate The following table shows the viscosity results obtained in the above samples:

TABLE II

[Viscosity in centipoises.]

| Sample | 0 Hours | 153 Hours | 602 Hours |
|---|---|---|---|
| 1 | 8.0 | 7.6 | 8.1 |
| 2 | 7.3 | 7.1 | 6.7 |
| 3 | 8.1 | 7.6 | 8.1 |
| 4 | 6.2 | 6.7 | 7.1 |
| 5 | 6.4 | 6.6 | 7.1 |
| 6 | 6.7 | 6.7 | 7.3 |

The above results show an extremely small change in viscosity over a fairly long period of time. Any increase in viscosity is probably due to the fact that the samples were stored at 85° C. which caused some evaporation of water. For comparison, it should be noted that the viscosity of water at 25° C. is 0.89 centipoise and the viscosity of glycerin at 25° C. is 954 centipoises.

It will also be noted from the table that the initial viscosities of the electrolytes having the silicate incorporated therein differ very little from the initial viscosities of the untreated electrolytes.

The mechanism of the reaction which inhibits the hydration effect appears to involve formation of a colloid, the particles of which have negative charges to repel the —OH ions which form the undesirable hydrate, e.g., $Al_2O_3$ to $Al(OH)_3$. However, tests made with other known corrosion-inhibiting compounds such as nitrites and chromates gave negative results, showing that not merely negative ions were required, and that the known corrosion inhibitors are not necessarily effective for the purposes involved here. In order to form the desirable colloid, it appears necessary that both the silicate and an ammonium compound be present in the solution, but the exact reaction, if any, between the two which takes place to prevent the hydrate from forming is not definitely known.

The silicate compounds which may be utilized in accordance with the invention are not limited to the sodium metasilicate or tetraethylorthosilicate mentioned above. Other inorganic silicates such as the sesquisilicates and orthosilicates may be used, and, in general, water soluble silicates such as the alkali silicates are satisfactory. Organic silicates other than tetraethylorthosilicate may also be used in accordance with the invention. Generally, the silicate compound should be sufficiently water soluble to produce a solution of at least 200–2000 p.p.m. in water. The presence of less than 200 p.p.m. of the silicate would not give sufficiently improved or prolonged life characteristics for the capacitor, whereas more than 2000 p.p.m. entails the risk of depositing the silicate from the colloidal state in which it appears to be most effective. In the present electrolyte compositions, the water, which provides the necessary conductivity through ionization of the ionogen salt, is mixed with a suitable proportion of ethylene glycol or other polyhydric alcohol to obtain low temperature stability. Where low temperatures are not encountered in the use of the electrode, the ethylene glycol component may be omitted entirely. The range of water content which may be used in the invention is from 25–100% by weight while the polyhydric alcohol may range from 75–0%. With respect to the ammonium ionogen salt, this component may be used in the electrolyte in the range of proportions from 0.1–15% by weight, the smaller amounts being used where high resistance is desired for the higher voltages, while the larger proportions in the specified range would be used to make the electrolyte more conductive under low voltage conditions.

The following examples of electrolyte compositions in percent by weight are given for the purposes of illustration only and to set forth specific formulations which have proved particularly satisfactory in accordance with the invention, it being understood that the invention is not limited to the specific compounds, proportions or amount stated:

EXAMPLE I

| | |
|---|---|
| Ethylene glycol | percent 57.9 |
| Distilled water | do 38.6 |
| Ammonium borate | do 3.5 |
| Sodium metasilicate | p.p.m. 400 |

This electrolyte composition has the capacitance and dissipation factor characteristics shown by the curves designated B in Figs. 2 and 3, as explained above. In tests made on initial low temperature characteristics it was further found that this electrolyte composition retained at —55° C. about 89% of the capacitance measured at 25° C. under 120 cycle per second frequency and about 78% of 1000 cycles per second, which constitutes a substantial improvement over similar electrolytes not stabilized by the silicate compound in accordance with the invention.

EXAMPLE II

| | |
|---|---|
| Ethylene glycol | percent 57.9 |
| Distilled water | do 38.6 |
| Ammonium borate | do 3.5 |
| Sodium metasilicate | p.p.m. 1000 |

This composition also provided marked improvement in electrical stability similar to that obtained with the Example I formulation, and proved even more stable than the latter after life tests of further prolonged periods. This electrolyte at —55° C. and 120 c.p.s. retained about 87% of the 25° C. capacitance, and about 77% of 1000 c.p.s. This electrolyte has a resistivity of about 200–300 ohm cm. at 25° C. and is suitable for low temperature use at 100–150 volts.

EXAMPLE III

| | |
|---|---|
| Water | percent 90 |
| Ammonium borate | do 10 |
| Sodium metasilicate | p.p.m. 500 |

This highly conductive electrolyte has a resistivity of about 30–50 ohm cm. and would be preferred for use under extremely low voltages such as at 5–50 volts.

EXAMPLE IV

| | |
|---|---|
| Ethylene glycol | percent 60 |
| Water | do 38 |
| Ammonium borate | do 2 |
| Tetraethylorthosilicate | p.p.m. 1725 |

This electrolyte has a resistivity of approximately 250–350 ohm cm. at 25° C. and is adapted for low temperature use in capacitors subjected to 100–200 volts.

EXAMPLE V

| | |
|---|---|
| Glycerol | percent 40 |
| Water | do 52 |
| Ammonium borate | do 8 |
| Tetraethylorthosilicate | p.p.m. 1000 |

The resistivity of this composition is about 100–200 ohm cm. at 25° C. and it is adapted for low temperature use at 50–150 volts.

EXAMPLE VI

| | |
|---|---|
| Water | percent 38.56 |
| Ethylene glycol | do 58.94 |
| Ammonium hydroxide | do 1.27 |
| Succinic acid | do 1.23 |
| Sodium metasilicate | p.p.m. 1000 |

This electrolyte has a resistivity of 150–350 ohm cm. at 25° C. and would be useful at 100–200 volts for low temperature application.

EXAMPLE VII

| | |
|---|---|
| Ethylene glycol | percent 50.4 |
| Distilled water | do 35.4 |
| Ammonium succinate | do 14.2 |
| Sodium metasilicate | p.p.m. 2000 |

EXAMPLE VIII

| | |
|---|---|
| Ethylene glycol | percent 45.36 |
| Distilled water | do 31.86 |
| Ammonium succinate | do 12.78 |
| Formamide | do 10.00 |
| Sodium metasilicate | p.p.m. 2000 |

The resistivity of both electrolytes in Examples VII and VIII is 45–55 ohm cm. at 25° C., making them useful for low temperature application at 50–100 volts.

While particular voltage conditions have been specified in connection with the above examples, it is to be understood that they are set forth merely to show that in order to achieve the improved low temperature properties described above, the electrolytes must be selected on a resistivity basis in which the resistivity is proportional to the rated voltage. For example, where the capacitor is used at low voltages and under extremely low temperature conditions the electrolyte selected should have a low resistivity. Where moderate temperature conditions prevail, this basis of selection is not necessary and any of the electrolytes may be employed consistent with other restrictive factors, e.g., the possibility of scintillation at excessive voltages.

It is apparent from the test results described above and shown in the drawings that the present electrolyte compositions provide exceptionally marked improvement in the life and electrical stability of electrolytic capacitors, particularly those having aluminum electrodes. The present electrolytes not only maintain the electrical properties of the capacitors at a high level even after prolonged shelf life at elevated temperatures, but also provide for operation of the capacitors over a wide range of temperature conditions. Due to the hydration inhibiting characteristic of the present electrolytes it is possible to increase the water content of the electrolyte beyond what was heretofore considered feasible, and in that way considerably improved conductivity and efficiency of the electrolytic capacitors are achieved. It will be noted that even where the present electrolytes were subjected to life tests almost twice as long as that of the unstabilized electrolytes, the percentage increases in capacitance and dissipation factor were but a minor faction of the increases in those values shown by the unstabilized compositions, and in fact as shown by Fig. 3 sample of the present electrolyte composition involved actually showed a decrease in percent D (i.e., lower power losses) after prolonged life tests.

As indicated, the present electrolytes are of particular value for preventing deterioration of aluminum electrodes in an electrolytic capacitor and thereby improving the electrical stability of the device. However, the electrolytes are not limited to such use. They may, for example, be effectively employed to prevent corrosion on other parts of the capacitor or other electrical devices in which such types of electrolytes may be used, e.g. in combination with aluminum containers which do not necessarily serve as electrical components in the device. The avoidance of hydration of the aluminum film in such cases will prevent contamination of the electrolyte due to the dissolving of the resulting hydrate therein, and will thus indirectly contribute to improved electrical stability of the electrical device.

While particular embodiments of the present invention have been described, it should be understood that the invention is not limited thereto since others skilled in the art may somewhat modify the specific compositions set forth without going outside the scope of the inventive concept involved. Accordingly, the appended claims are intended to cover all such equivalent variations as come within the true spirit and scope of the invention.

What we claim as new and desire to secure by Letters Patent of the United States is:

1. An electric capacitor comprising at least one aluminum electrode having a dielectric film formed thereon, and an aqueous liquid electrolyte containing in percent by weight 0.1–15% of a water soluble ammonium salt, and 200–2000 p.p.m. of a silicate compound selected from the group consisting of alkali silicates and tetraethylorthosilicate dispersed in the electrolyte.

2. An electric capacitor comprising at least one aluminum electrode having a dielectric film thereon and a liquid electrolyte consisting essentially in percent by weight of 25–99.9% of water, from 75–0% of a polyhydric alcohol, from 0.1–15% of a water soluble ammonium salt and from 200–2000 p.p.m. of a silicate compound selected from the group consisting of alkali silicates and tetraethylorthosilicate dispersed in the electrolyte.

3. An electrolytic capacitor comprising at least one aluminum electrode having a dielectric film of aluminum oxide thereon and a liquid electrolyte consisting essentially in percent by weight of from 25–99.9% of water, from 75–0% of ethylene glycol, from 0.1–15% of ammonium borate and from 200–2000 p.p.m. of sodium metasilicate dispersed in the electrolyte.

4. An electrolytic capacitor comprising at least one aluminum electrode having a dielectric film of aluminum oxide thereon and a liquid electrolyte consisting essentially in approximate percent by weight of 38% water, 58% ethylene glycol, 3.5% of ammonium borate and from 400–1000 p.p.m. of sodium metasilicate dispersed in the electrolyte.

5. A liquid aqueous electrolyte adapted for use with film-forming electrodes subject to deterioration by aqueous liquids, said electrolyte consisting essentially in percent by weight of from 25–99% of water, from 75–0% of a polyhydric alcohol, from 0.1–15% of a water soluble ammonium salt and from 200–2000 p.p.m. of a silicate compound selected from the group consisting of alkali silicates and tetraethylorthosilicate dispersed in the electrolyte.

6. A liquid aqueous electrolyte adapted for use in electric capacitors having aluminum parts with films formed thereon subject to corrosion by aqueous liquids, said electrolyte consisting essentially in percent by weight of from 25–99.9% of water, from 75–0% of ethylene glycol, from 0.1–15% of ammonium borate and from 200–2000 p.p.m. of sodium metasilicate dispersed in the electrolyte.

7. A liquid aqueous electrolyte adapted for use in electrolytic capacitors having aluminum parts with films formed thereon subject to corrosion by aqueous liquids, said electrolyte consisting essentially in approximate percent by weight of 38% water, 58% ethylene glycol, 3.5% of ammonium borate and from 400–1000 p.p.m. of sodium metasilicate dispersed in the electrolyte.

References Cited in the file of this patent

UNITED STATES PATENTS 1,270,784    Chubb _____ July 2, 1918

OTHER REFERENCES

Vail: "Soluble Silicates" (1952), pp. 168–169, Reinhold Pub. Co., New York, N.Y.